United States Patent [19]

Pignataro

[11] Patent Number: 4,663,602

[45] Date of Patent: May 5, 1987

[54] MAGNETIC CHUCK

[75] Inventor: Dominic F. Pignataro, Shrewsbury, Mass.

[73] Assignee: Walker Magnetics Group, Inc., Worcester, Mass.

[21] Appl. No.: 847,764

[22] Filed: Apr. 3, 1986

[51] Int. Cl.$^4$ ............................................. H01F 7/04
[52] U.S. Cl. ..................................... 335/286; 335/295
[58] Field of Search ............... 335/285, 286, 295, 302, 335/306

[56] References Cited

U.S. PATENT DOCUMENTS

| | | | |
|---|---|---|---|
| 3,039,026 | 6/1962 | Levesque | 335/286 |
| 4,075,589 | 2/1978 | Braillon | 335/286 |
| 4,575,702 | 3/1986 | Nitta et al. | 335/286 |

FOREIGN PATENT DOCUMENTS 813308  5/1959  United Kingdom ................ 335/295

Primary Examiner—George Harris
Attorney, Agent, or Firm—Pahl, Lorusso & Loud

[57] ABSTRACT

The magnetic chuck disclosed herein is of the permanent magnet type in which both a top plate and a shiftable pack comprise alternating major pole pieces and magnets, the pack being shiftable so that its magnets either aid or oppose the magnets in the top plate, thereby to change between holding and release states. Improved holding for thin workpieces is obtained by providing a central region in the top plate in which the major pole pieces are thinner than the magnets and in which a plurality of floating minor pole pieces are positioned in the gaps between the major poles. While less flux is available through the thinner major pole pieces, the floating pole pieces provide an increased number of transitions for flux between top plate and workpiece so the total holding force for thin workpieces is improved. Increased flux available at the outer regions to either side of the central region provides good holding force for larger workpieces so that the chuck is well-adapted for a wide range of applications such as may be found in machine shop tool rooms.

5 Claims, 3 Drawing Figures

MAGNETIC CHUCK

BACKGROUND OF THE INVENTION

The present invention relates to magnetic chucks and more particularly to permanent magnetic chucks of the type in which a top plate and a shiftable pack each comprise a plurality of major pole pieces alternating with permanent magnets, the top plate and the pack having equal pole pitches so that the pack can be shifted between a first position in which its magnets aid the top plate and a second position in which its magnets oppose the top plate.

In permanent magnet chucks of this type known heretofore, the character of the top plate has been uniform across its entire surface, the pole pitch being chosen as a compromise between a coarse pitch which was most suitable for large workpieces and a finer pitch which provided better holding of thin workpieces. Typically, such chucks are rectangular with the pole pieces extending transversely, i.e. across the width of the chuck and with the shifting of the pack occurring lengthwise. In some cases a floating pole was provided between major poles to somewhat improve the holding of thin workpieces.

Among the several objects of the present invention may be noted the provision of a magnetic chuck of the permanent magnet type which provide greatly improved holding power for thin workpieces without significantly sacrificing the holding power available for most thick workpieces; the provision of such a chuck which is suitable for holding a wide variety of workpieces such as may be encountered in a typical machine shop toolroom; the provision of such a chuck which preserves the known advantages of permanent magnet chucks in which releasing of a workpiece is obtained by merely shifting a pack in relation to a top plate, the pitch of the top plate and the pack being equal; the provision of such a magnetic chuck which is highly reliable and which is of relatively simple and inexpensive construction. Other objects and features will be in part apparent and in part pointed out hereinafter.

SUMMARY OF THE INVENTION

In general, it may be noted that the magnetic chuck according to the present invention departs from conventional permanent magnet chuck constructions in orienting the pole pieces along the length of the typical rectangular top plate, rather than transversely, and in providing a central region which differs in pole characteristics from the regions to either side.

Briefly, a magnetic chuck constructed in accordance with the present invention employs a rectangular top plate having a central region and two side regions, each of which extends the length of the top plate. Each of the side regions includes a plurality of major pole pieces which extend lengthwise of the top plate and a plurality of magnets between the pole pieces. The pole pieces and the magnets in the side regions are of substantially equal thickness, thereby establishing a characteristic pole pitch. While the central region also includes a plurality of major pole pieces extending lengthwise of the top plate with a plurality of magnets therebetween, the major pole pieces in the central region are substantially thinner than the major pole pieces of the side regions and the magnets in the central region are substantially thicker than the magnets in the side region. The pole pitch in the central region, however, is equal to the pole pitch in the side regions. Between each adjacent pair of major poles in the central region are provided a plurality of floating poles. Since the pole pitch is the same between the different regions in the top plate, the holding action of the chuck can be controlled by a rectangular pack having a plurality of pole pieces which extend lengthwise of the pack with magnets therebetween, the pole pitch of the pack being equal to that of the top plate.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
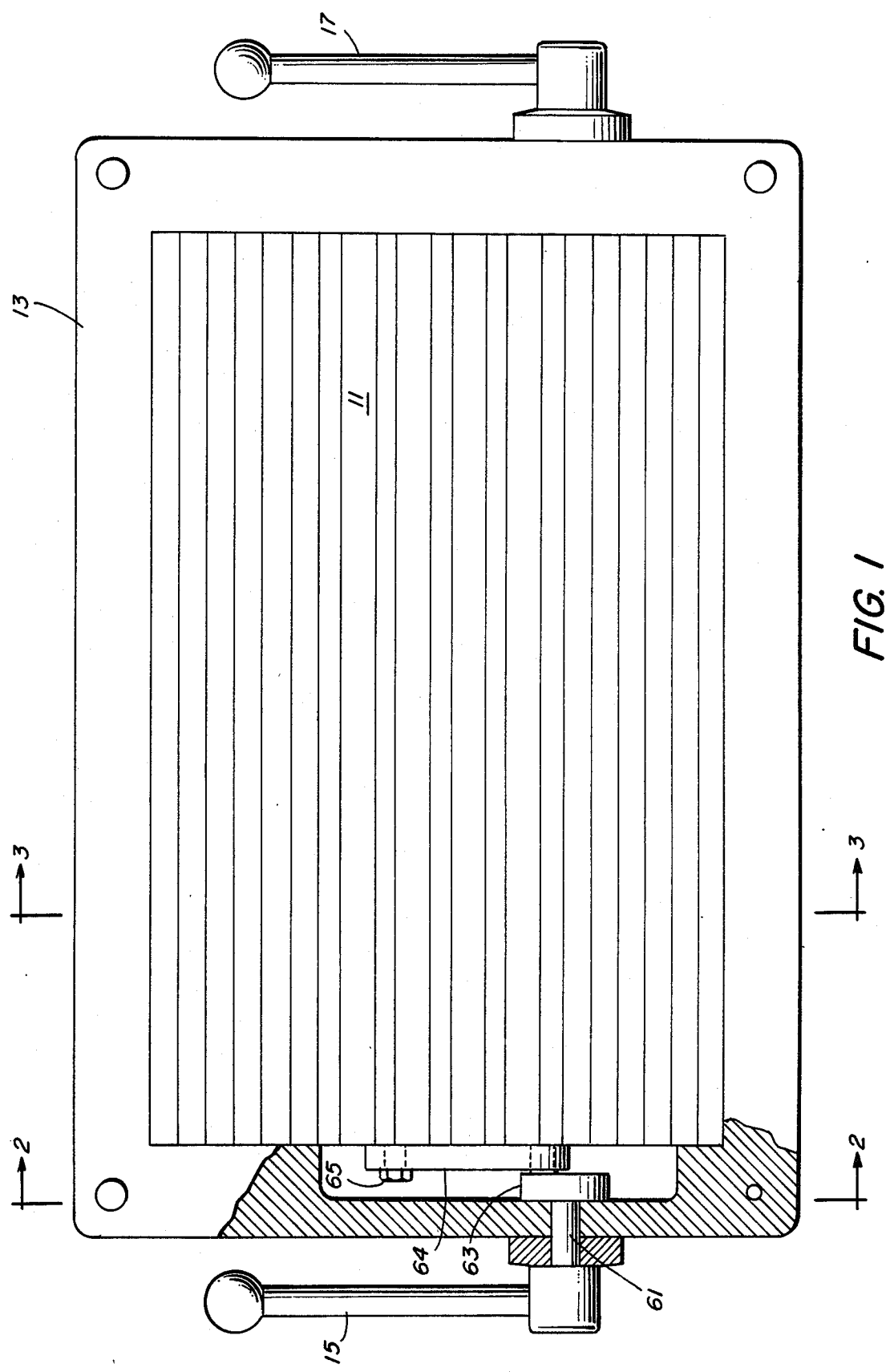
FIG. 1 is a top view of a magnetic chuck constructed in accordance with the present invention.

Referring now to FIG. 1, the magnetic chuck illustrated there is of a fairly conventional rectangular configuration in that it has a top plate 11 having aspect ratio of about two to one. Top plate 11 is mounted on a frame 13 which holds top plate 11 and the shiftable magnetic pack in substantial juxtaposition. For the purpose of description it may be assumed that the top plate of the chuck shown in FIG. 1 is six by twelve inches, which is a fairly common size. Unlike conventional permanent magnet chucks, however, the magnetic poles are aligned lengthwise on the top plate, rather than transverse thereto. No attempt has been made to show the detailed pole construction of the top plate 11 in FIG. 1 since the scale of the drawing is not adequate but the striations on the top plate in the drawing indicate the direction of the pole piece orientation. Correspondingly, the pack shifting mechanism is set up to shift the magnetic pack which underlies the top plate across the width of the chuck rather than longitudinally thereof as in conventional constructions. Pack shifting is accomplished by an internal eccentric and link mechanism, described hereinafter, controlled by one or more external handles, two handles 15 and 17 being shown in the embodiment illustrated.

Figure 3:
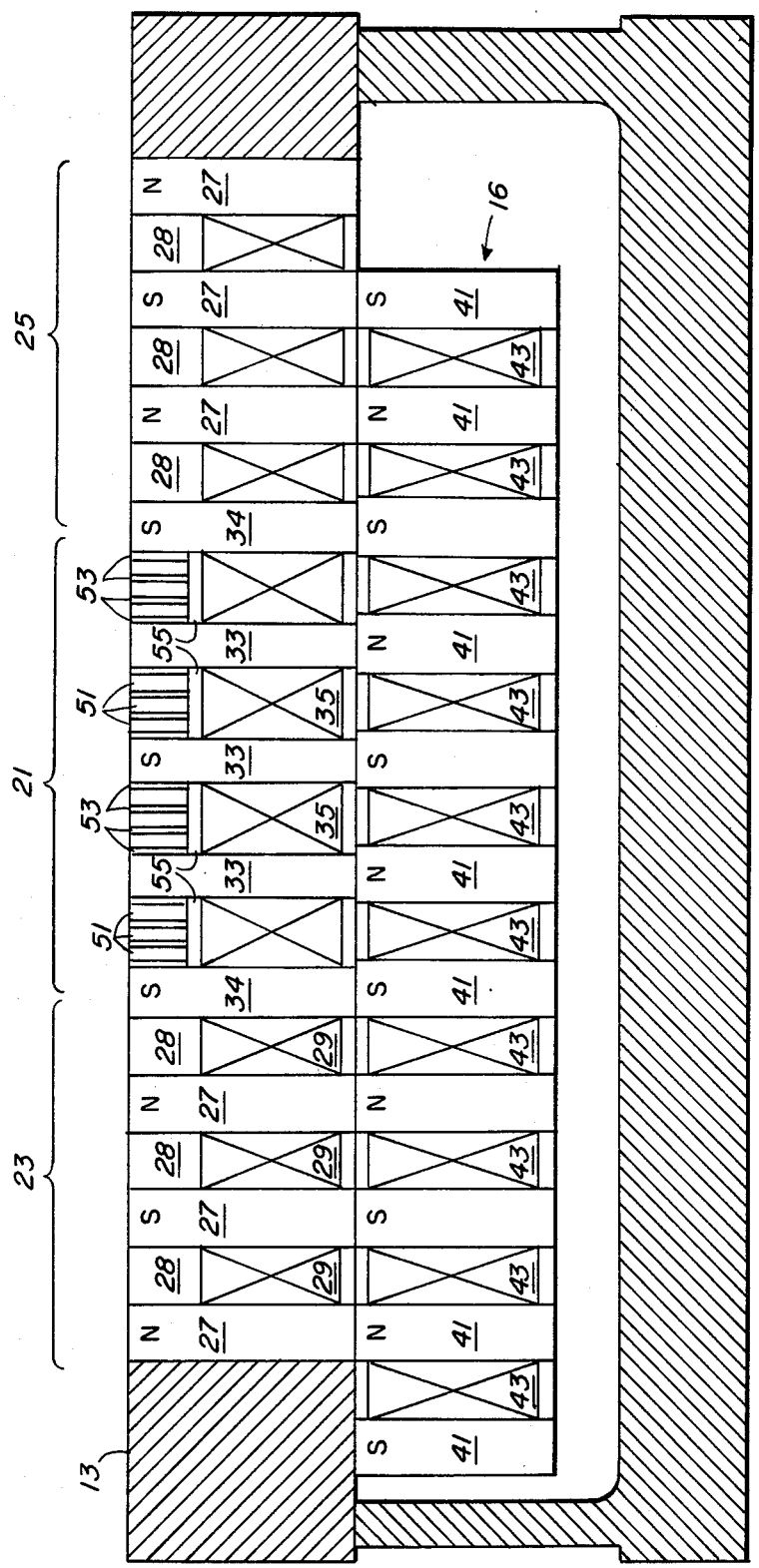
FIG. 3 is a sectional end view to an enlarged scale taken substantially on the line 3—3 of FIG. 1.

Referring now to the enlarged scale view of FIG. 3, it can be seen that the top plate 11 comprises three regions; a central region 21 and two side regions 23 and 25. Each of the side regions includes a plurality of major pole pieces, 27, which extend lengthwise of the top plate. A plurality of permanent magnets 29 are provided between adjacent pairs of the major pole pieces, the magnets being polarized so that the adjacent pole pieces are of opposite polarity. The magnets 29 are, however, not the full height of the pole pieces but are recessed with respect to the top surface of the top plate 11. The recesses are typically filled with a non-magnetic material, e.g. stainless steel or brass as indicated by reference character 28, though a resin material may also be used. If desired, these recesses may also contain a single floating minor pole as in some prior art constructions. In the side regions 23 and 25, the magnets 29 and the major pole pieces 27 are of equal thickness i.e., one quarter inch in the embodiment illustrated. This establishes a nominal pole pitch of one half inch.

The central region 21 also includes plurality of major pole pieces, designated by reference character 33 which extend lengthwise of the top plate, together with magnets 35 between the adjacent pole pieces. However, in this central region the major pole pieces are substantially thinner than the major pole pieces in the side regions e.g, 3/16 inch as against ¼ inch, and the magnets in the central region are substantially thicker than the magnets in the side region, i.e., 5/16 as against ¼ inch. In order to maintain exact registration with the shiftable pack, it is desirable that the major pole pieces at the boundaries between the central and outer regions be of an intermediate thickness, i.e., 7/32 of an inch, these being the pole pieces 34, as shown in FIG. 3.

As in the side sections, the magnets in the central section 21 are recessed below the top surface of the top plate. Set into each of these recesses are three floating or parasitic poles 51. These floating pole pieces are constructed of a suitable permeable material, e.g., soft iron, and extend the length of the top plate. The floating pole pieces 51 are separated from each other and from the major pole pieces 33 and the magnets 35 by spacers or shins of non-magnetic material, these spacers being indicated by reference characters 53 and 55 in the illustration of FIG. 2. Again, these spacers or fillers are typically brass or stainless steel though synthetic resin might also be used.

Since, in the central region 21, the major pole pieces are thinner and the magnets thicker than in the side regions 23 and 25, more room exists in between the major pole pieces and thus a plurality of floating or parasitic pole pieces may be placed as illustrated. While the use of thinner pole pieces in the central region reduces the maximum flux which might be put out into thick work pieces, the increased magnetizing force provided by the thicker magnets and the presence of the larger number of parasitic poles 51 provides, in the flux path, a greater number of transitons between the work piece and the top plate which greatly increases the holding power for thin work pieces. Futher, since most thick work pieces may be expected to be large enough to bridge from the central section to the outer sections, the total force for holding such larger work pieces will typically more than adequate.

As indicated previously, the shiftable pack 16 is also rectangular and has an overall outline which is similar to the top plate. As may be seen in FIG. 3, the pack 16 includes a plurality of pole pieces 41 which extend lengthwise of the pack and a plurality of magnets 43 between the pole pieces. The pole pitch of the pack 16 is equal to that of top plate 11 with the pole pieces 27 and magnets 43 being of equal thickness as illustrated, i.e., ¼ inch thick.

While the providing of increased holding force for thin work pieces as described herein involves the utilization of a top plate having a non-uniform pole pattern, this non-uniformity does not, in accordance with the present invention, necessitate any change in basic pole pitch. Accordingly, control of the holding force of the chuck can be accomplished by a shiftable magnetic pack having a uniform pole pitch much as in the prior art, though the shifting of the pack is therefore across the width or narrower dimension of the chuck, as contrasted with the longitudinal shift characteristic of the prior art.

Figure 2:
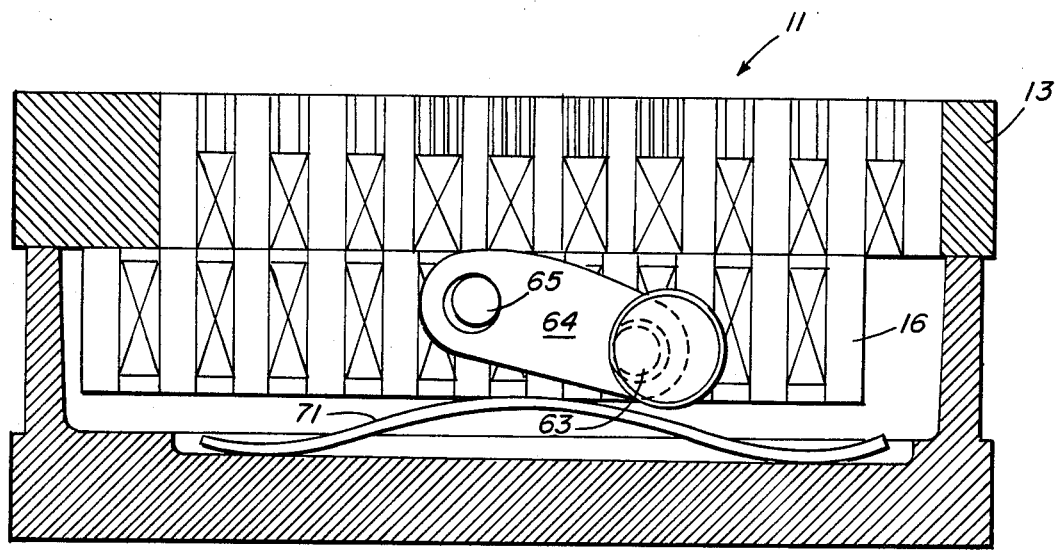
FIG. 2 is a sectional end view taken substantially on the line 2—2 of FIG. 1.

The shifting mechanism is shown in FIGS. 1 and 2. As may be seen, the handle 15 is pivotally mounted on a shaft 61. The shaft 61, carries an eccentric 63 which drives a link 64 coupled to the pack 16 by means of a pin 65. Accordingly, by operating the handles the pack may be shifted laterally of the chuck, the amount of the shift being equal to one pole pitch, i.e. one half inch, so that the pack can be moved from a first position in which the magnets of the pack aid the magnets of the top plate and a second position which the magnets of the pack oppose the top plate, thereby to effect release of a work piece in a manner similiar to the prior art. In FIGS. 2 and 3, the pack 16 is shown in the holding position. To release a workpiece, the pack is moved to the right. A stiff spring 71 is provided for holding the pack 16 up against the top plate 11.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A magnetic chuck comprising:
   a rectangular top plate having a central region and two side regions each of which extends the length of the top plate, each of said side regions comprising a plurality of major pole pieces which extend lengthwise of the top plate and a plurality of magnets between the pole pieces, the pole pieces and the magnets in said side regions being of substantially equal thickness thereby establishing a pole pitch, said central region comprising a plurality of major pole pieces which extend lengthwise of the top plate and a plurality of magnets between those pole pieces, the major pole pieces in said central region being substantially thinner than the major pole pieces in said side regions and the magnets in said central region being substantially thicker than the magnets in said side regions, the pole pitch in the central region being equal to the pole pitch in the side regions, there being a plurality of floating poles between each adjacent pair of major poles in said central region;
   a rectangular pack having an overall outline similiar to said top plate, said pack comprising a plurality of pole piece which extend lengthwise of the pack and a plurality of magnets between the pole pieces, the pole pitch of said pack being equal to that of the top plate;
   frame means for holding said top plate and said pack in juxtaposed relation, said pack being slidable laterally with respect to the top plate; and means for selectively moving said pack between a first position in which the magnets in the pack aid the magnets in the top plate and a second position in which the magnets in the pack oppose the magnets in the top plate.

2. A chuck as set forth in claim 1 wherein there are three or more floating poles between each adjacent pair of major poles in said central region.

3. A chuck as set forth in claim 2 wherein there is a single floating pole only between each adjacent pair of major poles in said side regions.

4. A chuck as set forth in claim 2 wherein there are no floating poles between major poles in said side regions.

5. A magnetic chuck comprising:

a rectangular top plate having a central region and two side regions each of which extends the length of the top plate, each of said side regions comprising a plurality of major pole pieces which extend lengthwise of the top plate and a plurality of magnets between the pole pieces, the pole pieces and the magnets in said side regions being of substantially equal thickness thereby establishing a pole pitch, said central region comprising a plurality of major pole pieces which extend lengthwise of the top plate and a plurality of magnets between those pole pieces, the major pole pieces in said central region being substantially thinner than the major pole pieces in said side regions and the magnets in said central region being substantially thicker than the magnets in said side regions, the pole pitch in the central region being equal to the pole pitch in the side regions, there being three or more floating poles between each adjacent pair of major poles in said central region, there being a single floating pole only between each adjacent pair of major poles in said side regions;

a rectangular pack having an overall outline similar to said top plate, said pack comprising a plurality of pole piece which extend lengthwise of the pack and a plurality of magnets between the pole pieces, the pole pitch of said pack being equal to that to the top plate;

frame means for holding said top plate and said pack in juxtaposed relation, said pack being slidable laterally with respect to the top plate; and means for selectively moving said pack between a first position in which the magnets in the pack aid the magnets in the top plate and a second position in which the magnets in the pack oppose the magnets in the top plate.

* * * * *